United States Patent
Sayenko et al.

(10) Patent No.: US 9,521,595 B2
(45) Date of Patent: Dec. 13, 2016

(54) COMPRESSED MODE ON PER FREQUENCY BAND BASIS

(75) Inventors: Alexander Sayenko, Espoo (FI); Perttu Aukusti Mella, Lepsämä (FI); Minna Maria Nevalainen, Helsinki (FI); Risto Matti Aalto, Riihimäki (FI)

(73) Assignee: Nokia Solutions and Networks Oy, Espoo (FI)

(*) Notice: Subject to any disclaimer, the term of this patent is extended or adjusted under 35 U.S.C. 154(b) by 152 days.

(21) Appl. No.: 13/985,300

(22) PCT Filed: Feb. 9, 2012

(86) PCT No.: PCT/EP2012/052190
§ 371 (c)(1),
(2), (4) Date: Oct. 8, 2013

(87) PCT Pub. No.: WO2012/100391
PCT Pub. Date: Aug. 23, 2012

(65) Prior Publication Data
US 2014/0029572 A1    Jan. 30, 2014

(30) Foreign Application Priority Data

Feb. 14, 2011    (WO) ............... PCT/EP2011/052155

(51) Int. Cl.
*H04W 36/00* (2009.01)
*H04W 72/04* (2009.01)
*H04W 72/08* (2009.01)

(52) U.S. Cl.
CPC ..... *H04W 36/0072* (2013.01); *H04W 36/0094* (2013.01); *H04W 72/0406* (2013.01); *H04W 72/08* (2013.01)

(58) Field of Classification Search
None
See application file for complete search history.

(56) References Cited

U.S. PATENT DOCUMENTS

| 5,305,467 A | * | 4/1994 | Herndon | ................. H04B 1/40 370/338 |
| 2006/0171359 A1 | * | 8/2006 | Schwarz | ........................ 370/331 |
| 2006/0183482 A1 | * | 8/2006 | Ueda | ............................. 455/439 |

(Continued)

OTHER PUBLICATIONS

3GPP TSG RAN WG2#72, R2-106610, Samsung, Applicability of Compressed Mode on all Carriers, Jacksonville, USA, Nov. 15-19, 2010 (3 pages).

(Continued)

*Primary Examiner* — Kodzovi Acolatse
(74) *Attorney, Agent, or Firm* — Harrington & Smith

(57) ABSTRACT

Network nodes, stations, and methods for a radio communications system. The disclosure relates to transmitting data in a radio communications system. In particular, methods and devices are presented for transmitting data in a radio communications system where capability information is communicated, said capability information including information on a capability for compressed mode transmissions on a per frequency band basis and where parameters to configure for compressed mode on said frequency band are signaled in case said information in said capability information indicated capability to apply compressed mode transmissions on per frequency band basis.

19 Claims, 8 Drawing Sheets

(56) References Cited

U.S. PATENT DOCUMENTS

2007/0149226 A1* 6/2007 de Vries ................ H04W 56/00
                                                        455/502
2009/0069007 A1* 3/2009 Xiao ..................... H04W 24/10
                                                        455/424

OTHER PUBLICATIONS

3GPP TSG-RAN WG3 Meeting #73bis; Zhuhai, China, Oct. 10-14, 2011; R3-112416; 10 pgs.
3GPP TSG-RAN WG3 Meeting #73bis; Zhuhai, China, Oct. 10-14, 2011; R3-112415; 4 pgs.
3GPP TSG RAN WG2 Meeting #74; Barcelona, Spain, May 9-13, 2011; R2-113474; 1 pg.
3GPP TSG-RAN WG2 Meeting #73; Taipei, Taiwan, Feb. 21-25, 2011; R2-111104; 3 pgs.
3GPP TSG RAN WG2#73; Taipei, Taiwan, Feb. 21-25, 2011; R1-110909; 2 pgs.
3GPP TSG-RAN WG2#72-bis; Dublin, Ireland, Jan. 17-21, 2011; R2-110419; 12 pgs.
3GPP TSG RAN WG2∩72-bis; Dublin, Ireland, Jan. 17-21, 2011; R2-110417; 2 pgs.

* cited by examiner

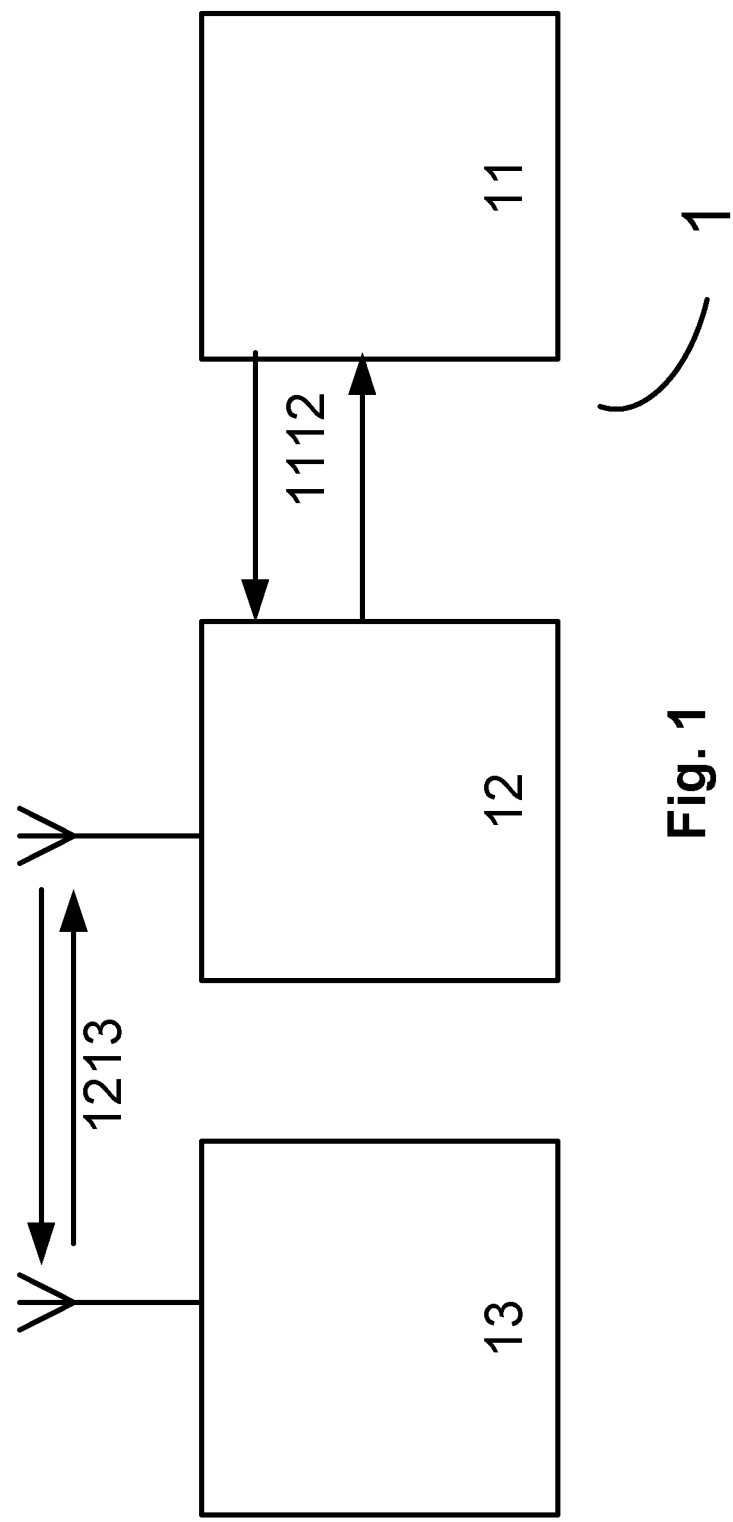
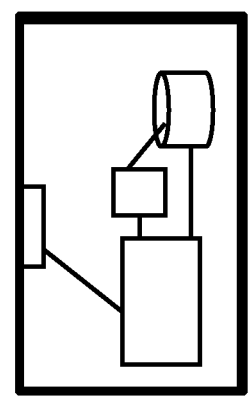
Fig. 1
Fig. 1b

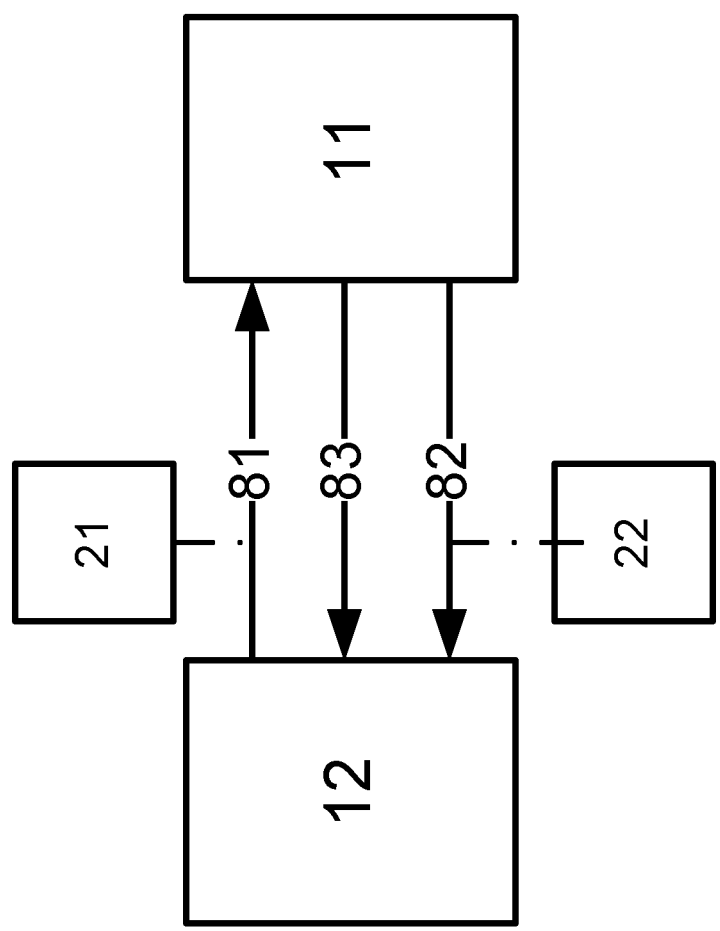

COMPRESSED MODE ON PER FREQUENCY BAND BASIS

FIELD OF THE INVENTION

The present invention relates to a radio communications system. Particularly, the present invention refers to methods, network nodes and stations configured to provide multiple bands in a radio communication system.

BACKGROUND OF THE INVENTION

Recent advances in high-speed broadband wireless access systems have introduced a capability of running several frequency carriers across multiple frequency bands.

In the context of this invention, the following definitions shall apply:

Frequency band: a range of frequencies for transmitting data; examples: frequency band A from 900-1000 MHz, frequency band B from 1800-1900 MHz, frequency band C from 2100-2200 MHz.

Frequency Carrier: a range within a frequency band; example: in W-CDMA, a carrier typically has a bandwidth of 5 MHz.

Radio Frequency (RF) Receiver: hardware device capable to operate in certain frequency bands and able to operate up to n carriers simultaneously.

The high-speed packet access (HSPA) as specified by the 3rd Generation Partnership Project (3GPP), supports up to two frequency carriers in two frequency bands according to HSPA release 9 (Rel-9) and up to four frequency carriers in two frequency bands according to HSPA release 10 (Rel-10). With regard to HSPA release 11 (Rel-11), up to eight carriers in two frequency bands are supported.

A user equipment (UE), complying with HSPA from Rel-9 onwards, can support the capability for inter-frequency measurements for the dual-band case. For supporting several carriers across multiple bands, a so-called multi-band UE would therefore comprise at least two RF receivers with at least one receiver for supporting reception and measurement on one frequency band.

With regard to inter-frequency measurements, necessary e.g. in the context of inter-frequency handovers, the so-called Compressed Mode (CM) is applied in case the UE is not capable of measuring a cell simultaneous with all its ongoing reception activities. According to the current specification, the compressed mode configuration applies to all the configured bands and carriers of the UE. Therefore, data interruption due to transmission gaps, which are used for said measurements, happens to all the configured carriers, irrespective of the bands the carriers are operating in, and independent on the UE's capabilities.

SUMMARY OF THE INVENTION

Network nodes embodying the invention are defined in claims 1 and 13, a base station embodying the invention is defined in claim 15, and methods embodying the invention are defined in claims 7, 14, and 17.

Further embodiments of the present invention are provided with the corresponding dependent claims.

In accordance with an embodiment there is provided a network node for a radio communications system, comprising:

receiving means (211) configured for receiving capability information, said capability information comprising information on capability to apply compressed mode on per frequency band basis; and signaling means (212) configured for signaling, towards a base station, parameters (22) to configure for compressed mode on a frequency band in case said information comprised in said capability information indicating the capability to apply compressed mode on per frequency band basis.

The capability information may comprise information on a capability of a base station to support compressed mode transmissions on a specific frequency band and/or information on a capability of a user equipment to receive compressed mode transmissions on a specific frequency band.

The node may be configured to cause compressed mode transmissions only on said frequency band in case said information comprised in said capability information indicating the capability to apply compressed mode transmissions on said frequency band. The node may be configured to cause compressed mode transmissions only on said frequency band in case information comprised in base station capability information and information comprised in user equipment capability information indicate the capability to apply compressed mode transmissions on said frequency band.

In accordance with an embodiment there is provided a method for a radio communications system, the method comprising:

receiving capability information, said capability information comprising information on capability to apply compressed mode transmissions on a per frequency band basis; and signaling, towards a base station, parameters to configure for compressed mode transmissions on a frequency band in case said information comprised in said capability information indicating the capability to apply compressed mode on per frequency band basis.

In accordance with an embodiment there is provided a network node for a radio communications system, comprising:

receiving means configured for receiving, from a base station, capability information comprising information on a capability to apply compressed mode transmissions on per frequency band basis;

forwarding means configured for forwarding, to a further network node, said capability information;

receiving means configured for receiving, from said further network node, parameters for application of compressed mode on a frequency band;

signaling means configured for signaling, towards said base station, said parameters for compressed mode on said frequency band;

receiving means configured for receiving, from said further network node, data for transmission by said base station; and transmitting means configured for transmitting said data towards said base station.

Such a network node can be seen as an intermediate node, passing on information exchanged between the further network node and the base station, allowing to apply the invention e.g. to a scenario with a Drift RNC located between a Serving RNC and a base station served by the Serving RNC.

In accordance with an embodiment there is provided a method for transmitting data in a radio communications system, the method comprising:

receiving, from a base station, capability information comprising information on a capability apply compressed mode transmissions on per frequency band basis;

forwarding, to a further network node, said capability information;

receiving, from said further network node, parameters for application of compressed mode on said frequency band;

signaling, towards said base station, said parameters;

receiving, from said further network node, data for transmission by said base station; and transmitting said data towards said base station.

In accordance with an embodiment there is provided a station for a radio communications system, comprising:

signaling means configured for signaling capability information comprising information on a capability to apply compressed mode on a per frequency band basis;

receiving means configured for receiving parameters to configure for compressed mode on a frequency band; and control means configured for applying compressed mode on said frequency band.

In accordance with an embodiment there is provided a method for a radio communications system, the method comprising:

signaling capability information comprising information on a capability of a station to apply compressed mode on a per frequency band basis;

receiving parameters to configure for compressed mode transmissions on a frequency band; and applying compressed mode on said frequency band.

The station may comprise a base station or a user equipment.

The information may comprise information on a capability of the base station and/or as user equipment to support compressed mode transmissions on a specific frequency band.

The signaling may comprise signaling said parameters in case said information comprised in said capability information indicating the capability to apply compressed mode transmissions only on said frequency band.

The base station and/or user equipment may be caused to apply compressed mode transmissions only on said frequency band in case said information comprised in said capability information indicating the capability to apply compressed mode transmissions on said first frequency band.

The base station and/or user equipment may be caused to apply compressed mode transmissions only on said frequency band in case information comprised in base station capability information and information comprised in user equipment capability information indicate capability to apply compressed mode transmissions on said first frequency band.

The network node according to the invention allows for applying the "per-band" compressed mode when it comes to measure an inter-band frequency without the above described compressed mode that introduces transmission gaps during which a UE performs actual measurements.

Use of user equipment capability information may allow a network node to efficiently apply the "per-band" as the network node can be provided with knowledge about the respective capabilities of the UE which has to perform said measurements on said inter-band frequency.

According to some embodiments of the present invention, said signaling means are further configured for signaling, to said user equipment, said parameters in case said information comprised in said user equipment capability information indicating the capability to apply compressed mode transmissions only on said first frequency band. This informs and enables the UE, which has to perform said measurements, to prepare for compressed mode transmissions only on said first frequency band from the network node.

In certain embodiments it can be ensured that the network node only applies said compressed mode transmissions only on said frequency band if the receiving base station is supporting this feature, thus preventing transmission failures.

BRIEF DESCRIPTION OF THE DRAWINGS

The present invention will be more clearly understood from the following description of the certain embodiments of the invention read in conjunction with the attached drawings, in which:

FIGS. 1 and 1*b* show an implementation of the present invention according to some embodiments of the present invention.

FIG. 8 shows an implementation of the present invention according to some embodiments of the present invention.

DESCRIPTION OF CERTAIN EMBODIMENTS

Figure 2:
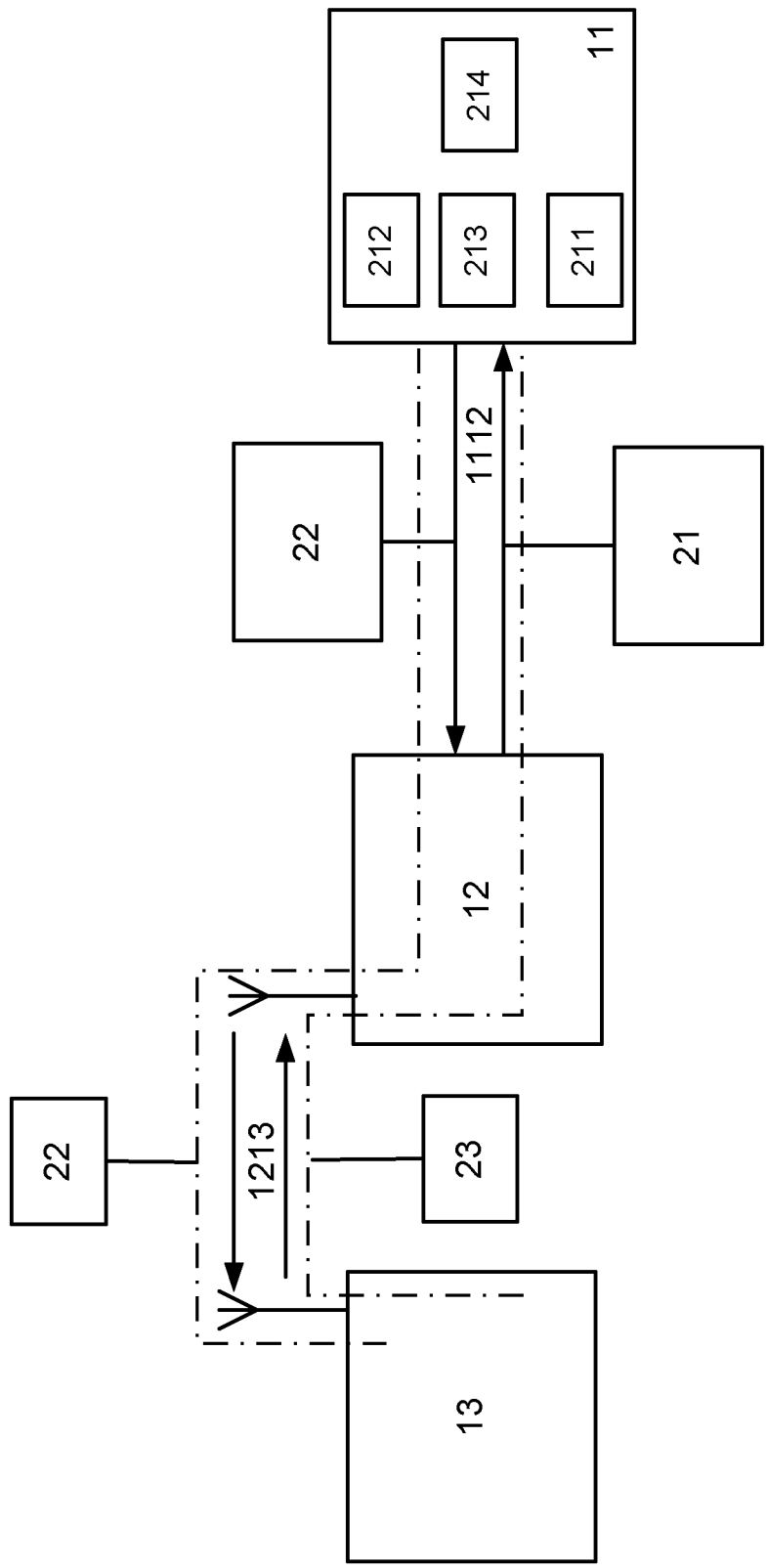
FIG. 2 shows a network node according to some embodiments of the present invention.

In the HSPA Rel-9, a new feature was introduced that allows a UE and the network to transmit downlink (DL) data over two non-adjacent carriers residing in different bands, as already described above. Along with this functionality, a new UE capability bit was proposed that serves as indication to the network that a UE can measure an inter-band frequency without above described compressed mode that introduces transmission gaps during which a UE performs actual measurements. It should be noted that despite this capability, a UE still has to apply the compressed mode gaps when it is configured on both bands, but the network asks to measure on a different frequency in either band or in a quite different band.

Another aspect of the compressed mode is the so-called "per-band" compressed mode. Since a UE has two independent receivers to support dual bands, only one receiver can be put into the compressed mode without interrupting another one. As an example, if a UE is configured on bands A and B, and the network asks to measure an additional frequency on band B, it is necessary to put only the band B receiver into the compressed mode.

However, currently there is no way for the network to rely upon the legacy way of measurements with only the compressed mode, which might be the only solution implemented in the network due its internal radio resource management (RRM) reasons. At the same time, the "per-band" compressed mode gives additional benefits for the network in terms of uninterrupted data transmission in one of the bands.

It has to be noted that the compressed mode configuration is per whole UE, not per a carrier. In addition, a UE uses the fact whether the compressed mode patterns are configured or not as an implicit indication for which measurement type should be used. If a UE supports "Inter-frequency measurements without the compressed mode" capability, but the compressed mode patterns are configured by the network, then a UE is supposed to use them despite the capability it has.

Once "per-band" compressed feature is applied, which also requires the compressed mode patterns, there is no way to distinguish between the two. In other words, there is no way for the network with a limited RRM and measurement functionality to support correctly UEs with the "Inter-frequency measurements without the compressed mode" capability and the "per-band" compressed mode feature.

Therefore, to provide a method for transmitting data in a radio communications network, it is proposed to:
1. Extend the RRC level measurement command message that will indicate whether "per-band" compressed mode or the legacy compressed mode should be used by a UE.
2. A similar extension is proposed for the IuB interface between the RNC and NodeB, so that the latter knows whether the compressed mode patterns are applied only to one particular band or all the bands.
3. The NodeB is enabled to signal its measurement capabilities to RNC.

According to some embodiments of the invention, an implementation of the proposed solution is as follows:
1. The measurement control message according to HSPA Rel-9 is extended by introducing a "Per-band compressed" Information Element (IE), presence of which means that a UE is asked to apply the compressed mode only to one band.
2. A similar extension is introduced for the IuB interface, so that the NodeB knows whether the UE is going to use the compressed mode pattern on all the bands or only on one of them.
3. The NodeB signals its capability to the RNC indicating whether its implementation supports the "per-band" compressed mode.

If there is an already deployed Rel-9 NodeB, then it will not obviously signal the "per-band" compressed mode measurement capability to RNC, which in turn will not ever activate it for a UE. The UE will use the legacy compressed mode when the patterns are applied to all the bands. If the NodeB indicates a support for this feature (because of later software releases), then it is up to RNC to decide whether to use an old style for measurements (e.g., an older software release or an RRM) or to activate the new type of measurements.

FIG. 1 shows an implementation of the present invention according to some embodiments of the present invention.

In particular, FIG. 1 shows an exemplary radio communications system 1 according to some embodiments of the invention. According to the scenario depicted in FIG. 1, the radio communications system 1 comprises a network node 11, a base station 12, and a user equipment (UE) 13.

The user equipment may be provided by any device capable of radio communications via multiple of frequency bands. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. The user equipment 13 may receive and transmit signals over an air interface 1213 with multiple cells via an appropriate transceiver apparatus. The transceiver apparatus may be provided for example by means of a radio part and associated antenna arrangement.

User equipment 13, base station 12 and network node 11 are provided with appropriate control apparatus. The control apparatus can be configured to provide control functions in association with signaling of capability information and compressed mode instructions and configuration of the base station and/or the user equipment accordingly. For this purpose the control apparatus can comprise at least one memory, at least one data processing unit and at least one an input/output interface. In each node the control apparatus can be configured to execute an appropriate software code to provide the control functions. A control apparatus 16 is shown in FIG. 1b.

According to some embodiments of the invention, the network node 11 is Radio Network Controller (RNC), and radio base station 12 is a NodeB. The RNC 11 and the NodeB 12 are connected via an interface 1112, NodeB 12 and UE 13 are connected via a radio link 1213. The scenario depicted in FIG. 1, according to further embodiments, relates in particular to a HSPA system, with the interface 1112 between RNC and NodeB being an Iub interface.

FIG. 2 shows an implementation of the present invention according to some embodiments of the present invention. In particular, FIG. 2 shows a network node 11 according to some embodiments of the present invention. The network node 11, or RNC, is configured for transmitting data in the radio communications system 1 as follows. The RNC 11 comprises receiving means 211 configured for receiving a base station capability information 21, said base station capability information 21 comprising information on a capability of a base station 12 to transmit compressed mode transmissions only on a first frequency band independently from a second frequency band.

I.e., as described above, Rel-9 HSPA supports up to two frequency carriers in two frequency bands and up to four frequency carriers in two frequency bands according to HSPA Rel-10. A Rel-9 radio communications network supports the capability for inter-frequency measurements for the dual-band case, and the RNC 11, according to the present invention, therefore supports compressed mode transmissions (i.e. gapped transmissions) on the first frequency band in the dual-band case, while transmissions on the second frequency band are carried out without transmission gaps.

Furthermore, the RNC 11 comprises signaling means 212 configured for signaling, towards said base station 12, parameters 22 to configure for compressed mode transmissions only on said first frequency band in case said information comprised in said base station capability information 21 indicating the capability to apply compressed mode transmissions only on said first frequency band.

The signaling of said base station capability information 21 and said parameters 22 allows for applying the above discussed "per-band" compressed mode and when it comes to measure an inter-band frequency without the above described compressed mode that introduces transmission gaps during which a UE performs actual measurements. I.e., there is the advantage of an increased performance during inter-frequency measurements since non-CM transmissions are continued on the second frequency band and CM transmissions are applied to the first frequency band, only.

According to some embodiments of the present invention, the parameter 21 is implemented as a Cell Capability Container information element (IE) indicating the cell capability by setting eg., a corresponding bit in a BIT String or a corresponding value from an enumerated list of values.

An example for the information element Cell Capability Container is given in the following:

| IE/Group Name | Presence | Range | IE Type and Reference | Semantics Description |
|---|---|---|---|---|
| Cell Capability Container | | | BIT STRING (128) | Each bit indicates whether a cell supports a particular functionality or not. The value 1 of a bit may indicate that the corresponding functionality is supported in a cell and value 0 indicates that the corresponding functionality is not supported in a cell. Each bit is defined as follows. The nth bit: "per-band" compressed mode. |

According to some embodiments of the present invention, the parameter 22 comprises a definition on transmission gaps used during the transmission. The transmission gaps are defined by sequence of gap patterns which need to be applied by the UE and the base station. The gap pattern is defined by at least a status flags (activate, deactivate), the starting point of the transmission pattern, the length of the transmission gap. The optimized compressed mode may be indicated as well by a set of parameter values or by an indication specifically determining the compression mode in use.

Also shown in FIG. 2 is a network node 11, or RNC, according to further embodiments of the present invention, comprising further receiving means 213 configured for receiving, from the user equipment 13, a user equipment capability information 23, said user equipment capability information 23 comprising information on a capability of said user equipment 13 to receive compressed mode transmissions only on a first frequency band independently from a second frequency band.

According to some embodiments of the present invention, the parameter 23 is implemented as an information element (IE) indicating the user equipment capability by setting eg., a corresponding bit in a BIT String or a corresponding value from an enumerated list of values.

As the UE 13 is not directly connected to the RNC 11, the user equipment capability information 23 is transmitted from the UE 13 to the RNC 11 via the NodeB 12, as depicted in FIG. 2 by a dotted line. However, it is clear that the transmission of said user equipment capability information 23 can be seen as a direct transmission from the UE 13 to the RNC 13.

This allows the RNC 11 to efficiently apply the above discussed "per-band" compressed mode, as said further receiving means 213 ensure that the RNC 11 has knowledge about the respective capabilities of the UE 13 which has to perform said measurements on said inter-band frequency.

According to some embodiments of the present invention, and as also depicted in FIG. 2, said signaling means 212 comprised in the RNC 212 are further configured for signaling, to said user equipment 13, said parameters 22 in case said information comprised in said user equipment capability information 23 indicating the capability to apply compressed mode transmissions only on said first frequency band.

Again, as the UE 13 is not directly connected to the RNC 11, the these parameters 22 are transmitted from the RNC 11 to the UE 13 via the NodeB 12, as depicted in FIG. 2 by a dotted line. However, it is clear that the transmission of said parameters 22 can be seen as a direct transmission from the RNC 13 to the UE 13.

This informs and enables the UE 13, which has to perform said measurements, to prepare for compressed mode transmissions only on said first frequency band from the network node.

According to some embodiments of the present invention, the RNC 11 further comprises transmitting means 214, as also depicted in FIG. 2. These further transmitting means 214 are configured for transmitting, towards said base station 12 and to the user equipment 13, said compressed mode transmissions only on said first frequency band in case said information comprised in said base station capability information 21 indicating the capability to apply compressed mode transmissions only on said first frequency band.

This ensures that the RNC 11 only applies said compressed mode transmissions only on said first frequency band if the receiving base station 12 is supporting this feature, thus preventing transmission failures.

According to further embodiments of the present invention, the transmitting means 214 are configured for transmitting, towards said base station 12 and to said user equipment 13, compressed mode transmissions only on said first frequency band in case both, said information comprised in said base station capability information 21 and said information comprised in said user equipment capability information 23, indicating the capability to apply compressed mode transmissions only on said first frequency band.

This ensures that the RNC 11 only applies said compressed mode transmissions only on said first frequency band if both, the receiving base station 12 and the receiving UE 13, are supporting this feature, thus preventing transmission failures.

Figure 3:
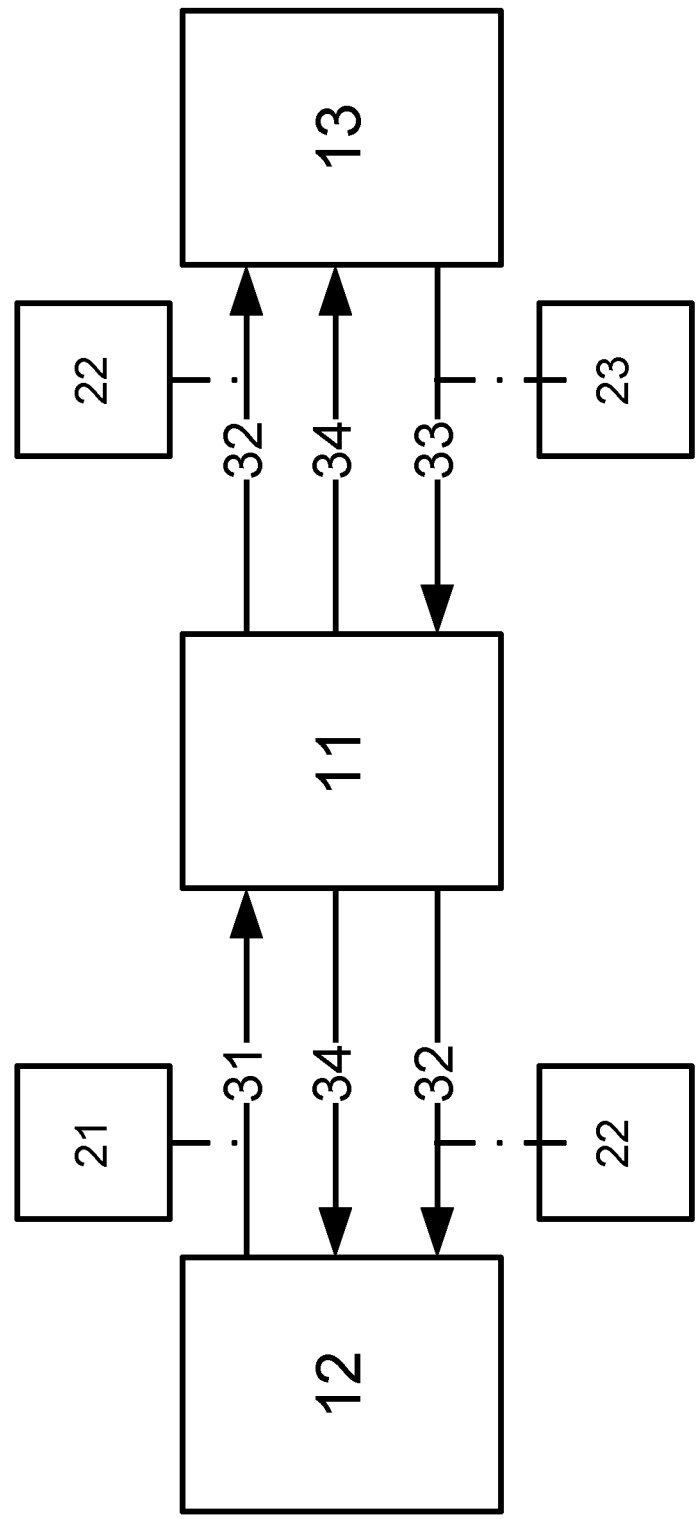
FIG. 3 shows an implementation of the present invention according to some embodiments of the present invention.

While FIG. 1 and FIG. 2 show the system and device architecture, FIG. 3 shows the method for transmitting data in the radio communications network 1 according to some embodiments of the present invention. The method for transmitting data in a radio communications system 1 comprises receiving 31 a base station capability information 21, said base station capability information 21 comprising information on a capability of a base station 12 to transmit compressed mode transmissions only on a first frequency band independently from a second frequency band. The method further comprises signaling 32, towards said base station 12, parameters 22 to configure for compressed mode transmissions only on said first frequency band in case said information comprised in said base station capability information 21 indicating the capability to apply compressed mode transmissions only on said first frequency band.

As depicted in FIG. 3, the base station capability information 21 is sent from the base station 12, or NodeB, towards the RNC 11, and received in the receiving step 31 by the RNC 11. The parameters 22 are sent from the RNC 11 to the NodeB 12 in the signaling step 32.

The method according to the invention allows for applying the above discussed "per-band" compressed mode when it comes to measure an inter-band frequency without the above described compressed mode that introduces transmission gaps during which the UE 13 performs actual measurements.

According to some embodiments of the present invention, as also depicted in FIG. 3, the method comprises receiving 33, from the user equipment 13, a user equipment capability information 23, said user equipment capability information 23 comprising information on a capability of said user equipment 13 to receive compressed mode transmissions only on a first frequency band independently from a second frequency band.

This allows the RNC 11 to efficiently apply the above discussed "per-band" compressed mode, as said further receiving means ensure that the RNC has knowledge about the respective capabilities of the UE 13 which has to perform said measurements on said inter-band frequency.

According to some embodiments of the present invention, said signaling 32 further comprising signaling, to said user equipment UE 13, said parameters 22 in case said information comprised in said user equipment capability information 23 indicating the capability to apply compressed mode transmissions only on said first frequency band.

This informs and enables the UE 13, which has to perform said measurements, to prepare for compressed mode transmissions only on said first frequency band from the RNC 11.

According to some embodiments of the present invention, the method further comprises transmitting 34, towards said base station 12 and to the user equipment 13, compressed mode transmissions only on said first frequency band in case said information comprised in said base station capability information 21 indicating the capability to apply compressed mode transmissions only on said first frequency band.

This ensures that RNC 11 only applies said compressed mode transmissions only on said first frequency band if the receiving base station 12 is supporting this feature, thus preventing transmission failures.

According to some embodiments of the present invention, the method further comprises transmitting 34, towards said base station and to said user equipment, compressed mode transmissions only on said first frequency band in case both, said information comprised in said base station capability information 21 and said information comprised in said user equipment capability information 23, indicating the capability to apply compressed mode transmissions only on said first frequency band.

This ensures that the RNC 11 only applies said compressed mode transmissions only on said first frequency band if both, the receiving base station 12 and the receiving UE 13, are supporting this feature, thus preventing transmission failures.

Figure 4:
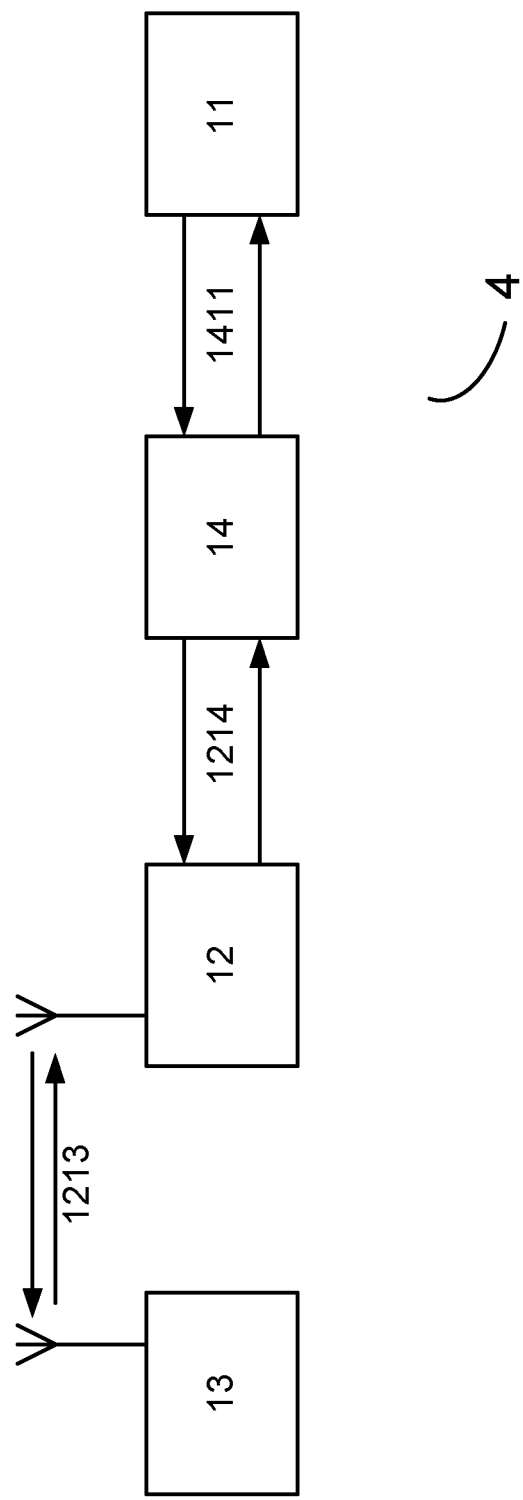
FIG. 4 shows an implementation of the present invention according to some embodiments of the present invention.

FIG. 4 depicts a further possible scenario for applying the present invention. In the radio communications network 4 as depicted in FIG. 4, the NodeB 12 is connected to an intermediate network node 14, which is in turn connected to the RNC 11. Both network nodes 11, 14 are Radio Network Controllers, however according to some embodiments of the present invention, network node 11 represents the Serving RNC (SRNC) for the NodeB 12, while network node 14 represents the Drift RNC (DRNC) for the NodeB 12. SRNC 11 and DRNC 14 are connected via an interface 1411, while the NodeB 12 and the DRNC 14 are connected via an interface 1214. The scenario depicted in FIG. 4, according to further embodiments, relates in particular to a HSPA system, with the interface 1411 between SRNC 11 and DRNC 14 being an Iur interface, and the interface 1214 between NodeB 12 and DRNC 14 being an IuB. NodeB 12 and UE 13 are connected via a radio link 1213.

Figure 5:
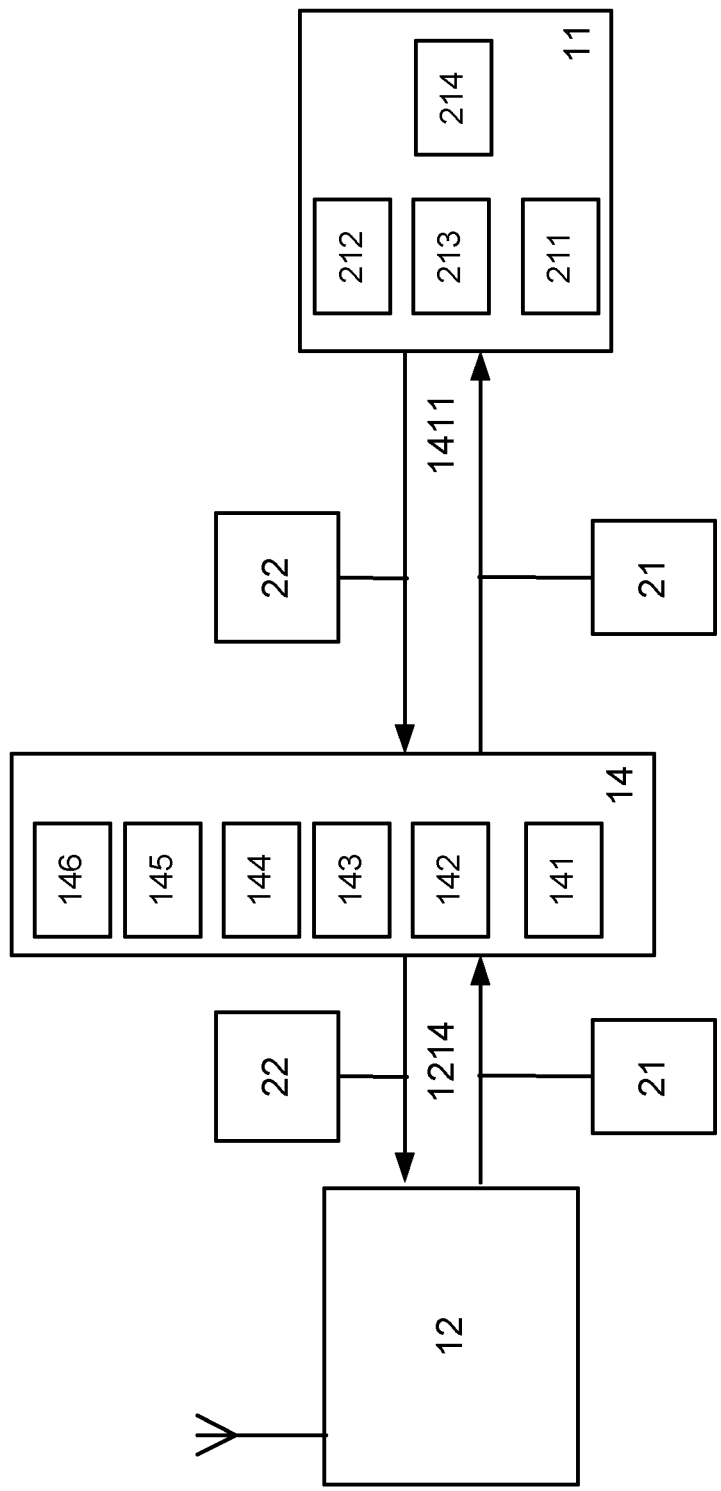
FIG. 5 shows an implementation of the present invention according to some embodiments of the present invention.

FIG. 5 shows an implementation of the present invention according to some embodiments of the present invention. In particular, FIG. 5 shows a further network node 14 according to some embodiments of the present invention. The network node 14, as depicted in FIG. 5, is an intermediate node, or DRNC, configured for transmitting data in a radio communications system 4, comprising receiving means 141 configured for receiving, from a base station 12, a base station capability information 21, said base station capability information 21 comprising information on a capability of said base station 12 to transmit compressed mode transmissions on a first frequency band independently from a second frequency band. Furthermore, the network node 14, or DRNC, comprises forwarding means 142 configured for forwarding, to a further network node 11, or SRNC, said base station capability information 21. The network node 14, or DRNC, further comprises receiving means 143 configured for receiving, from said further network node 11, or SRNC, parameters 22 for said base station 12 to configure for compressed mode transmissions only on said first frequency band. Furthermore, said network node 14, or DRNC, comprises signaling means 144 configured for signaling, towards said base station 12, said parameters 22 to configure for compressed mode transmissions only on said first frequency band. Furthermore, said network node 14, or DRNC, comprises receiving means 145 configured for receiving, from said further network node 11, or SRNC, data for transmissions by the base station. Furthermore, said network node 14, or DRNC, comprises transmitting means 146 configured for transmitting, towards said base station 12, said data.

Such a network node 14, or DRNC, can be seen as an intermediate node, passing on information exchanged between the further network node 11, or SRNC, and the base station 12, allowing to apply the invention to the scenario depicted in FIG. 4 and FIG. 5, with a Drift RNC 14 located between a Serving RNC 11 and a base station 12 served by the Serving RNC 11.

Figure 6:
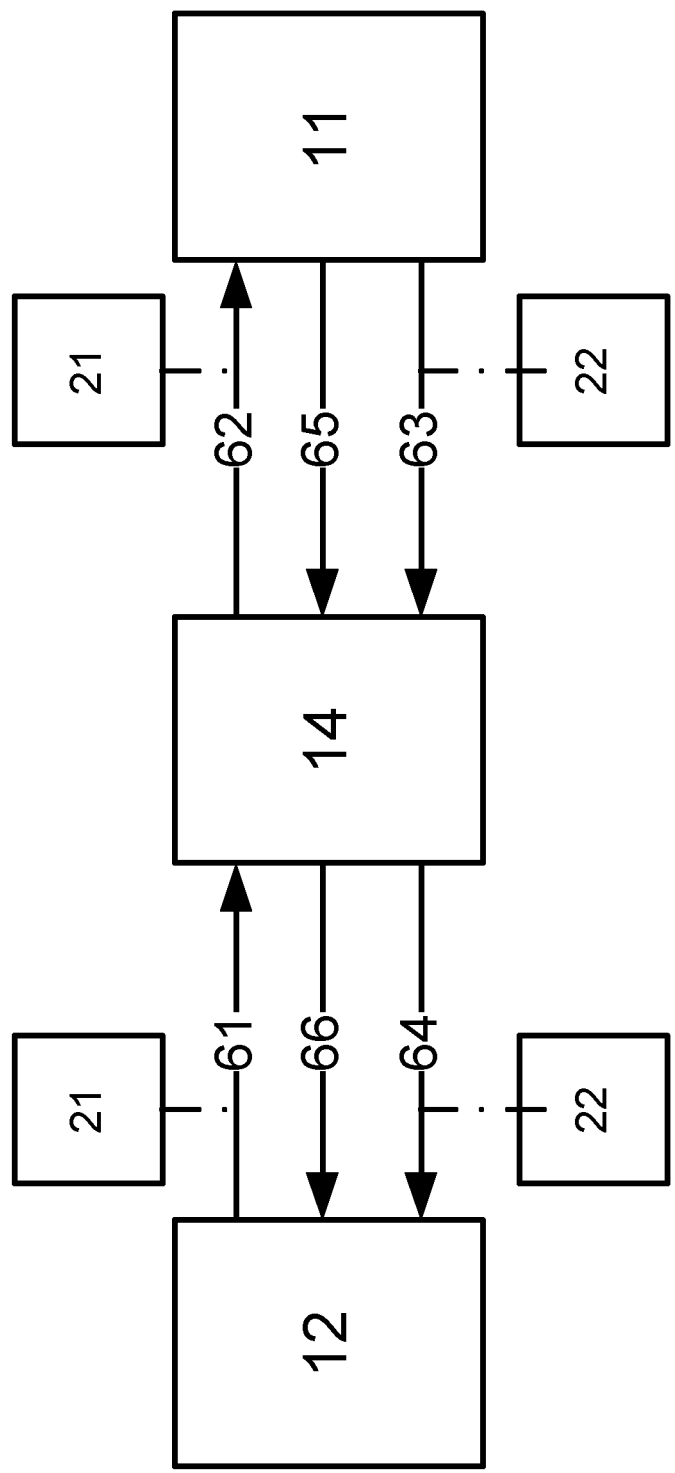
FIG. 6 shows an implementation of the present invention according to some embodiments of the present invention.

While FIG. 4 and FIG. 5 show the system and device architecture with regard to the intermediate node 14, or DRNC, as discussed above, FIG. 6 shows the method for transmitting data in the radio communications network 4 according to some embodiments of the present invention from the perspective of the intermediate node 14, or DRNC. The method comprises receiving 61, from a base station 12, a base station and/or user equipment capability information 21, said capability information 21 comprising information on a capability to transmit compressed mode transmissions on a first frequency band independently from a second frequency band; forwarding 62, to a further network node 11, or SRNC, said capability information 21; receiving 63, from said further network node 11, or SRNC, parameters 22 to configure for compressed mode transmissions on said first frequency band; signaling 64, towards said base station 12, said parameters 22 to configure for compressed mode transmissions on said first frequency band; receiving 65, from said further network node 11, or SRNC, data for transmissions by the base station; and transmitting 66, towards said base station 12, said data.

Such a method enables the usage of an intermediate network node 14, or DRNC, as described above, passing on information exchanged between the further network node 11, or SRNC, and the base station 12, allowing to apply the invention e.g. to a scenario with a Drift RNC 14 located between a Serving RNC 11 and a base station 12 served by the Serving RNC.

Figure 7:
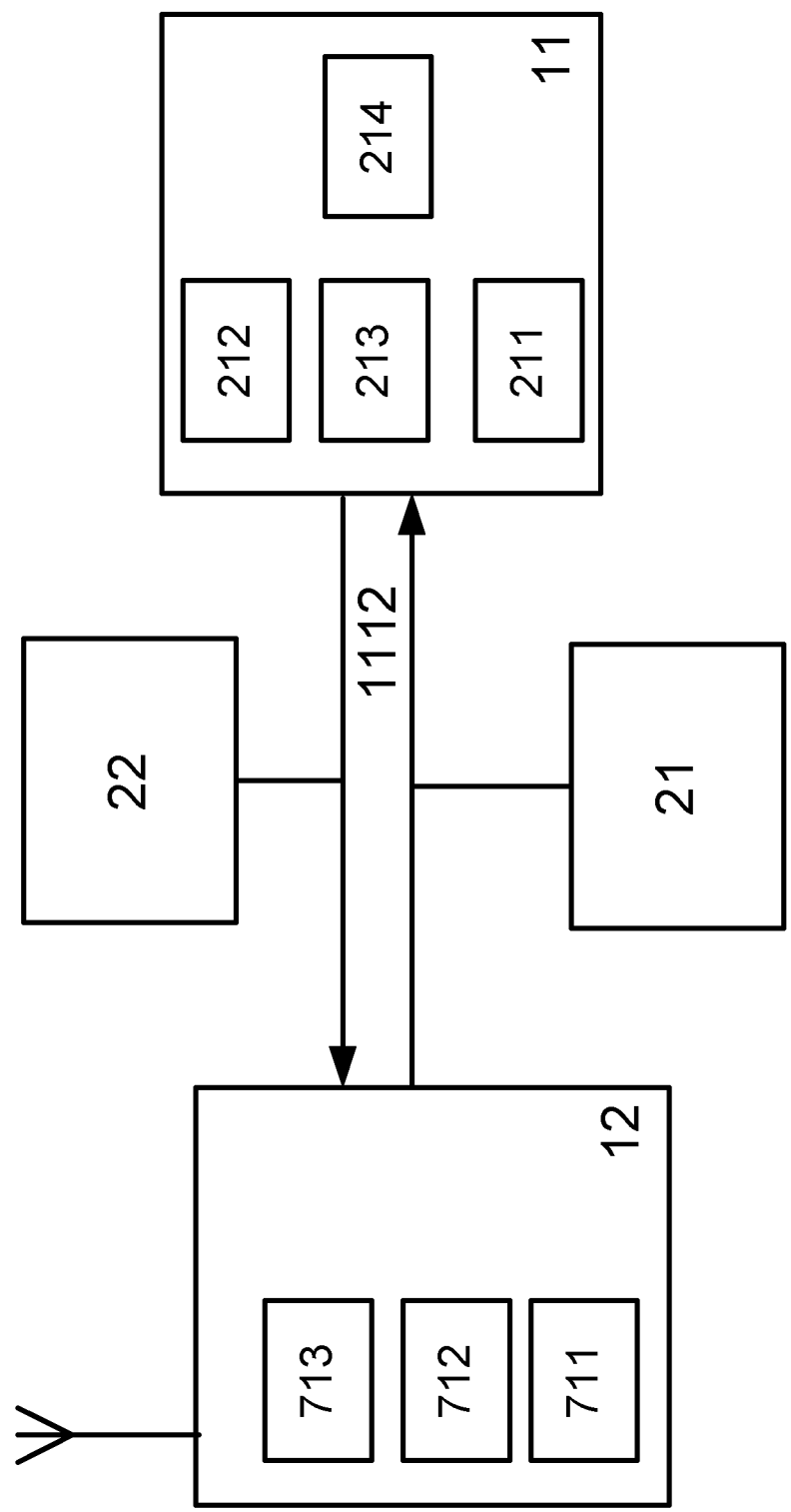
FIG. 7 shows an implementation of the present invention according to some embodiments of the present invention.

FIG. 7 shows a base station according to some embodiments of the present invention. The base station 12 for transmitting data in a radio communications system comprises signaling means 711 configured for signaling a base station capability information 21, said base station capability information 21 comprising information on a capability of said base station 12 to transmit compressed mode transmissions only on a first frequency band independently from a second frequency band; receiving means 712 configured for receiving parameters 22 to configure for compressed mode transmissions only on said first frequency band; and receiving means 713 configured for receiving compressed mode transmissions only on said first frequency band.

The base station 12 as depicted in FIG. 7, according to the present invention, allows for applying the above discussed "per-band" compressed mode when it comes to measure an inter-band frequency without the above described conventional compressed mode that introduces transmission gaps during which a UE performs actual measurements.

While FIG. 7 shows device architecture with regard to the base station 12, or NodeB, as discussed above, FIG. 8 shows the method for transmitting data in the radio communications network according to some embodiments of the present invention from the perspective of the base station 12, or NodeB.

The method comprises signaling 81 a base station capability information 21, said base station capability information 21 comprising information on a capability of said base station 12 to transmit compressed mode transmissions only on a first frequency band independently from a second frequency band; receiving 82 parameters 22 to configure for compressed mode transmissions only on said first frequency band; and receiving 83 compressed mode transmissions only on said first frequency band.

The method according to the present invention as depicted in FIG. 8 allows for applying the above discussed "per-band" compressed mode when it comes to measure an inter-band frequency without the above described conventional compressed mode that introduces transmission gaps during which a UE performs actual measurements.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. Therefore, it is intended that the foregoing detailed description should be regarded as illustrative rather than limiting.

LIST OF ABBREVIATIONS

DL Downlink
DRNC Drift RNC
HSPA High-speed packet access
IE Information Element
RNC Radio network controller
RRC Radio resource control
RRM Radio resource management
SRNC Serving RNC
UE User equipment

LIST OF REFERENCES 1, 4 Radio communications system
11, 14 Network node
1112, 1214 Interfaces (Iub)
1213 Radio link
12 Base station (NodeB)
13 User equipment (UE)
141, 143, Receiving means
142 Forwarding means
144 Signaling means
1411 Interface (Iur)
146 Transmitting means
21 Base station capability information
211 Receiving means
212 Signaling means
213 Receiving means
22 Parameters
23 User equipment capability information
31, 33, 82, 83 receiving
62 forwarding
32, 64, 81 signaling
34, 66 transmitting
711 Signaling means
712, 713 Receiving means

The invention claimed is:

1. A network node comprising:
   at least one processor; and
   at least one memory including computer program code, where the at least one memory and the computer program code are configured, with the at least one processor, to cause the network node to at least:
   transmit data in a radio communications system, comprising:
   receiving base station capability information, said base station capability information comprising information on a changed capability of said base station to transmit compressed mode transmissions only on a first frequency band independently from a second frequency band; and
   based on the base station capability information, signaling, towards a user equipment via said base station, parameters to configure for compressed mode transmissions only on said first frequency band while non-compressed mode transmissions are carried out on said second frequency band based on said information comprised in said base station capability information indicating the capability to apply compressed mode transmissions only on said first frequency band.

2. The network node according to claim 1, wherein the at least one memory including the computer program code is configured with the at least one processor to cause the network node to receive, from the user equipment, the user equipment capability information, said user equipment capability information comprising information on a capability of said user equipment to receive compressed mode transmissions only on said first frequency band, independently from said second frequency band.

3. The network node according to claim 2, wherein the at least one memory including the computer program code is configured with the at least one processor to cause the network node to signal, to said user equipment, said parameters based on said information comprised in said user equipment capability information indicating the capability to apply compressed mode transmissions only on said first frequency band while non-compressed mode transmissions are carried out on said second frequency band.

4. The network node according to claim 1, wherein the at least one memory including the computer program code is configured with the at least one processor to cause the network node to transmit towards said base station and to the user equipment, compressed mode transmissions only on said first frequency band based on said information comprised in said base station capability information indicating the capability to apply compressed mode transmissions only on said first frequency band.

5. The network node according to claim 1, wherein the at least one memory including the computer program code is configured with the at least one processor to cause the network node to
transmit towards said base station and to said user equipment, compressed mode transmissions only on said first frequency band based on both, said information comprised in said base station capability information and said information comprised in said user equipment capability information, are indicating the capability to apply compressed mode transmissions only on said first frequency band while non-compressed mode transmissions are carried out on said second frequency band.

6. The network node according to claim 1, where the base station capability information is triggered by the changed capability of said base station.

7. The network node according to claim 6, where the changed capability of the base station is based on a later software release at the base station.

8. The network node according to claim 1, wherein said changed base station capability information is indicated in corresponding values of a BIT string of an information element received by the network node.

9. A method, comprising:
transmitting data in a radio communications system, comprising:
receiving base station capability information, said base station capability information comprising information on a changed capability of said base station to transmit compressed mode transmissions only on a first frequency band independently from a second frequency band; and
based on the base station capability information, signaling, towards a user equipment via said base station, parameters to configure for compressed mode transmissions only on said first frequency band while non-compressed mode transmissions are carried out on said second frequency band based on said information comprised in said base station capability information indicating the capability to apply compressed mode transmissions only on said first frequency band.

10. The method according to claim 9, further comprising:
receiving, from the user equipment, the user equipment capability information, said user equipment capability information comprising information on a capability of said user equipment to receive compressed mode transmissions only on said first frequency band independently from said second frequency band.

11. The method according to claim 10, said signaling further comprising signaling, to said user equipment, said parameters based on said information comprised in said user equipment capability information indicating the capability to apply compressed mode transmissions only on said first frequency band while non-compressed mode transmissions are carried out on said second frequency band.

12. The method according to claim 9, further comprising:
transmitting, towards said base station and to the user equipment, compressed mode transmissions only on said first frequency band based on said information comprised in said base station capability information indicating the capability to apply compressed mode transmissions only on said first frequency band.

13. The method according to claim 9, further comprising:
transmitting, towards said base station and to said user equipment, compressed mode transmissions only on said first frequency band based on both, said information comprised in said base station capability information and said information comprised in said user equipment capability information, are indicating the capability to apply compressed mode transmissions only on said first frequency band while non-compressed mode transmissions are carried out on said second frequency band.

14. A network node comprising:
at least one processor; and
at least one memory including computer program code, where the at least one memory and the computer program code are configured, with the at least one processor, to cause the network node to at least:
transmit data in a radio communications system, comprising:
receiving, from a base station, base station capability information, said base station capability information comprising information on a changed capability of said base station to transmit compressed mode transmissions only on a first frequency band independently from a second frequency band;
forwarding, to a further network node, said base station capability information;
receiving, from said further network node, parameters for said base station to configure for compressed mode transmissions only on said first frequency band;
based on the parameters, signaling, towards said base station via said further network node, said parameters to configure for compressed mode transmissions only on said first frequency band while non-compressed mode transmissions are carried out on said second frequency band;
receiving, from said further network node, compressed mode transmissions only on said first frequency band; and
transmitting, towards said base station, said compressed mode transmissions only on said first frequency band.

15. A method, comprising:
transmitting data in a radio communications system, comprising:
receiving, from a base station, base station capability information, said base station capability information comprising information on a changed capability of said base station to transmit compressed mode transmissions only on a first frequency band independently from a second frequency band;
forwarding, to a further network node, said base station capability information;

receiving, from said further network node, parameters for said base station to configure for compressed mode transmissions only on said first frequency band;

signaling, towards said base station, said parameters to configure for compressed mode transmissions only on said first frequency band while non-compressed mode transmissions are carried out on said second frequency band;

receiving, from said further network node, compressed mode transmissions only on said first frequency band; and transmitting, towards said base station, said compressed mode transmissions only on said first frequency band.

16. A base station comprising:
at least one processor; and
at least one memory including computer program code, where the at least one memory and the computer program code are configured, with the at least one processor, to cause the base station to at least:
transmit data in a radio communications system, comprising:
signaling base station capability information, said base station capability information comprising information on a changed capability of said base station to transmit compressed mode transmissions only on a first frequency band independently from a second frequency band;

receiving parameters to configure for compressed mode transmissions only on said first frequency band while non-compressed mode transmissions are carried out on said second frequency band; and receiving compressed mode transmissions only on said first frequency band.

17. The base station according to claim 16, where the signaling the base station capability information is triggered by the changed capability of said base station.

18. The base station according to claim 17, where the changed capability of the base station is based on a later software release at the base station.

19. A method, comprising:
transmitting data in a radio communications system, comprising:
signaling base station capability information, said base station capability information comprising information on a changed capability of a station to transmit compressed mode transmissions only on a first frequency band independently from a second frequency band;

receiving parameters to configure for compressed mode transmissions only on said first frequency band while non-compressed mode transmissions are carried out on said second frequency band; and receiving compressed mode transmissions only on said first frequency band.

* * * * *